United States Patent [19]

Weber et al.

[11] Patent Number: 4,624,145
[45] Date of Patent: Nov. 25, 1986

[54] RACK AND PINION REACTION FORCE SENSOR

[75] Inventors: Robert E. Weber; Russell J. Wakeman, both of Newport News, Va.; Barry J. Driscoll, Fort Wayne, Ind.

[73] Assignee: Allied Corporation, Morris Township, Morris County, N.J.

[21] Appl. No.: 716,288

[22] Filed: Mar. 26, 1985

[51] Int. Cl.[4] .................................... G01L 3/14
[52] U.S. Cl. ........................................ 73/861.31
[58] Field of Search ............ 73/862.31, 862.54, 862.65

[56] References Cited

U.S. PATENT DOCUMENTS

| | | | |
|---|---|---|---|
| 3,832,897 | 9/1974 | Schenck | 73/862.31 |
| 4,112,751 | 9/1978 | Grunbaum | 73/862.54 |
| 4,188,821 | 2/1980 | Elias | 73/862.31 |

FOREIGN PATENT DOCUMENTS 0421893  3/1974  U.S.S.R. .......................... 73/862.65

Primary Examiner—Charles A. Ruehl
Attorney, Agent, or Firm—Russel C. Wells; Markell Seitzman

[57] ABSTRACT

A rack and pinion reaction force sensor 10 as may be used in electric power assist steering systems, uses sensing element means 34 mounted adjacent to a bearing 18 in a sensor housing 22 to sense the linear reaction on the pinion shaft 16 to the force applied to the rack 12. The sensing element means 34 determines the magnitude and direction of turning of the steering system of a motor vehicle. The output of the sensing element means 34 is amplified and supplied as an input to the control electronics in the overall power assist steering system. A zirconia substrate forms a bearing support means 26 for the bearing 18 and is trimmed to provide a predetermined spring rate which responds to reaction force from the pinion shaft 16.

9 Claims, 1 Drawing Figure

RACK AND PINION REACTION FORCE SENSOR

FIELD OF INVENTION

This invention relates to force sensors in general and more particularly to a reaction force sensor responding to the force applied to a rack by a pinion.

BACKGROUND OF INVENTION

One particular application for force sensors is in the field of electric power steering. An electric power steering system requires as one of its inputs, a measure of the steering effort. Prior art methods of measuring the steering effort have utilized torque sensors for measuring the torque on the input shaft of the steering mechanism. The problem encountered in such measurements is that the sensor is constantly moving either rotationally or linearly. This constant moving makes electrical connections to the sensor very difficult. In addition as all such measurements are very low signal levels, difficulty in positioning the electrical circuit means close enough to the sensor to minimize the exposure of the circuit to Electromagnetic Interference (EMI) is encountered.

SUMMARY OF THE INVENTION

The rack and pinion reaction force sensor of the present invention overcomes the previously identified problems. It is a principal advantage of the invention to provide a sensor that is stationary and responsive to the amount of torque applied to the steering effort. It is a further advantage of the present invention to provide a sensor package that is effective to minimize the effect of EMI. It is still a further advantage of the present sensor to locate the amplifying electronics as close to the sensing element means as possible to avoid long signal transmission lines.

A rack and pinion reaction force sensor for sensing the force applied by the pinion to the rack comprises a housing means encircling a portion of the pinion shaft adjacent to the rack. At each end of the housing, which is cylindrical in shape with suitable flanges for locating and securing the housing, is a bearing. The bearings are mounted on the pinion shaft and the inner race of the bearings rotate with the rotation of the shaft. The outer race of each bearing is mounted in a bearing support plate which also functions as a sealing or enclosing member for the housing.

The pinion is operatively connected to a rack such as a steering rack in a motor vehicle steering system. On the bearing support plate nearest the pinion, there is positioned a sensing element means such as a strain gage means which is responsive to the reaction force on the pinion which force is opposite to the force applied to the rack.

DESCRIPTION OF THE DRAWINGS

The sole FIGURE is a perspective view with parts broken away, of a preferred embodiment of the rack and pinion reaction force sensor.

DETAILED DESCRIPTION

Figure 1:
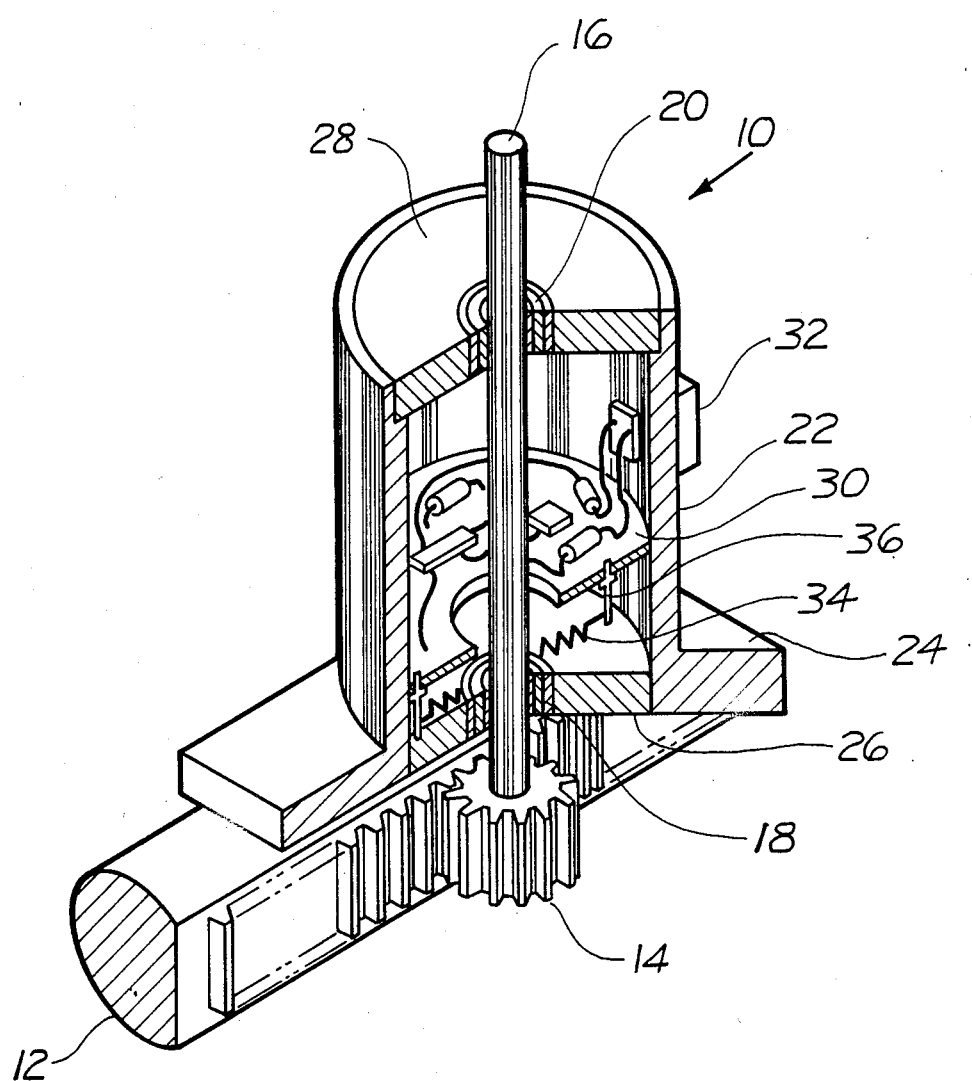

Referring to the FIGURE there is illustrated in perspective form a rack and pinion reaction force sensor 10 as may be used in the steering system of a motor vehicle. The steering rack 12 is a section of the mechanism which has at either end the road wheels of a motor vehicle. The rack 12 is driven by a pinion 14 mounted at the end of a pinion shaft 16. The other end of the pinion shaft 16 is operatively coupled to the steering wheel of the motor vehicle.

As the operator of the motor vehicle turns the steering wheel, not shown, the power assist means such as an electric or hydraulic motor means, not shown, is activated. The motor means is coupled to the pinion shaft 16 for rotating the shaft in either a clockwise direction or counterclockwise direction to turn the road wheels. This is accomplished, in a conventional manner, by the pinion 14 driving the steering rack 12. Therefore, the amount of rotation of the steering wheel and the torque applied thereto which is translated through the rotation of the pinion shaft 16, is proportional to the amount of turn of the road wheels.

As illustrated in the FIGURE, positioned adjacent to the rack 12 and pinion 14, is a sensor 10 according to the present invention. The sensor 10 comprises a pair of bearings 18,20 mounted in a spaced apart relationship in a housing 22. As illustrated, the housing 22 has means such as flanges 24 to locate and support the sensor 10. The outer race of each bearing is supported in a bearing support means 26,28, which also functions as an enclosure means sealing the sensor 10. Mounted intermediate the bearings is an electronic circuit means 30 or signal amplifying means for the sensor 10. The output of the electronic circuit means 30 is connected to an electrical connector 32 on the outer surface of the housing 22.

The first bearing support means 26 is mounted as close to the pinion 14 as is practical. This is to respond to linear reaction force of the pinion shaft 16 as the pinion 14 is rotated driving the rack 12. The first bearing support means 26 has mounted thereon a sensing element means 34 such as a strain gage means adapted to respond to the linear reaction force of the pinion shaft 16. The material of the first bearing support means 26 is an insulating material, such as toughened zirconia, which is suitably trimmed to give an appropriate spring rate. The strain gage means is then mounted on the first bearing support means 26 in such a way to respond to the reaction forces of the pinion shaft 16 as transmitted through the bearing to the first bearing support means 26. By doing so, the strain gage means changes its electrical properties in response to the reaction force on the pinion 14 from the rack 12. Another sensing element means 34 that may be used is a thick film resistance bridge.

The electrical output of the sensing element means 34 is a very small signal that is susceptible to any electrical noise signals in the environment. In order to reduce such interference and susceptibility, the electronic circuit means 30 is mounted near the sensing element means 34 to reduce the length of signal transmission. As illustrated it is spaced from the first bearing support means 26 and intermediate the two bearings 18, 20. The electronic circuit means 30 is supported by terminal pins 36 some of which are connected at each end respectively to the sensing element means 34 and the electronic circuit means 30. The signal output of the electronic circuit means 30 is connected to the connector 32.

As the pinion shaft 16 is rotated, the pinion 14 drives the rack 12. The more the rotation of the pinion shaft 16, the higher the force becomes between the pinion 14 and the rack 12. This increased force will be reflected as a torque on the pinion shaft 16 and through the first bearing 18 to the sensing element means 34. This reflection is a linear reaction force that in effect will be applied to one end of a diameter of the bearing 18. The sensing element means 34, positioned to respond to this force, will compress thereby changing its electrical characteristics. The portion of the sensing element means 34, which is positioned to respond to this reaction force at the other end of the same diameter of the bearing 18, will also respond to this force by stretching and thereby change its electrical characteristics in the opposite direction.

As the pinion shaft 16 is rotated in the opposite direction, the same reactions occur but the sensing element means 34 responds opposite to that described above. The electronic circuit means 30 responds to the direction of the reaction force to generate an electrical signal that has both direction and magnitude of force information.

This electrical signal is used by the electronic computing unit (ECU), not shown, in the motor vehicle to compare with the other sensor information as to the direction and amount of turning demanded by the operator of the motor vehicle. The output of this comparison is supplied to the steering power assist means, such as an electric motor or hydraulic motor, to complete the turning required.

The housing 22 provides a modular package allowing servicing to the system or the sensor 10 without replacing the entire rack 12. In addition the housing 22 allows for locating effective EMI shielding around the sensor 10.

What is claimed is:

1. A rack and pinion reaction force sensor for sensing the force applied to the rack by the pinion mounted at the end of a shaft means, said sensor comprising:
    a housing encircling a portion of the shaft means, said housing having at least one bearing mounted on the shaft means and rotatable thereby;
    a bearing support means surrounding said bearing and located adjacent the pinion;
    sensing element means located on said bearing support means and responsive to the reaction force on the shaft due to the force applied to the rack by the pinion; and
    electronic circuit means mounted in said housing, electrically connected to said sensing element means and operable to generate an electrical signal proportional to the reaction force.

2. A rack and pinion reaction force sensor according to claim 1 wherein said sensing element means is a strain gage means mounted on said bearing support means and positioned to respond to the force applied by the pinion to the rack.

3. A rack and pinion reaction force sensor according to claim 1 wherein said bearing support means is trimmed to provide a predtermined spring rate which is monitored by said sensing element means.

4. A rack and pinion reaction force sensor according to claim 3 wherein said sensing element means is a strain gage means mounted on said bearing support means and positioned to respond to the force applied by the pinion to the rack.

5. A rack and pinion reaction force sensor according to claim 3 wherein said sensing element means is a thick film resistance bridge means mounted on said bearing support means.

6. A rack and pinion reaction force sensor according to claim 1 wherein said bearing support means is fabricated from zirconia and trimmed to provide a predetermined spring rate.

7. A rack and pinion reaction force sensor according to claim 1 additionally including a connector means mounted on said housing and electrically connected to said electronic circuit means.

8. A rack and pinion reaction force sensor according to claim 1 wherein said sensor additionally includes another bearing support means surrounding a second bearing aligned with and spaced from said bearing in the direction away from said pinion, both of said bearing support means cooperate with said housing to close and seal said sensor.

9. A rack and pinion reaction force sensor according to claim 8 wherein said electronic circuit means is mounted intermediate said pair of bearings in said housing and a connector means is mounted on said housing and electrically connected to said electronic circuit means.

* * * * *